W. PANTON.  
MACHINERY FOR SCOURING AND DRESSING LEATHER.

No. 193,615.  
2 Sheets—Sheet 1.  
Patented July 31, 1877.

Witnesses  
S. N. Piper  
L. W. Miller

William Panton  
by his attorney  
R. H. Eddy

W. PANTON.
MACHINERY FOR SCOURING AND DRESSING LEATHER.
No. 193,615. Patented July 31, 1877.
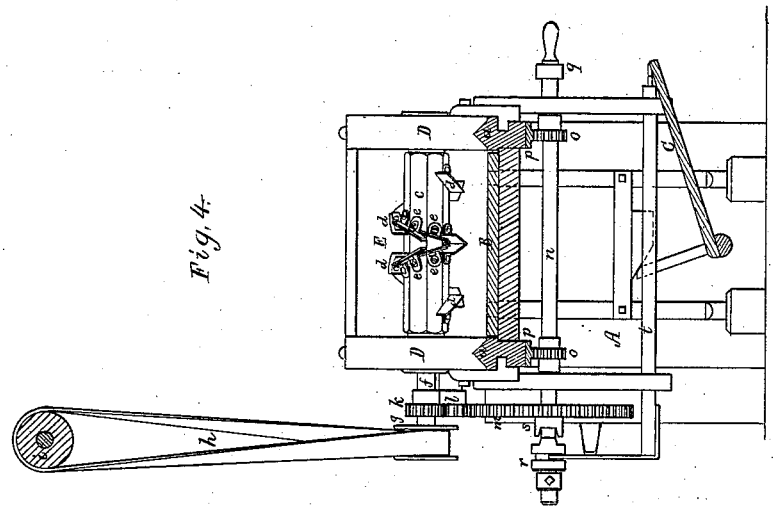
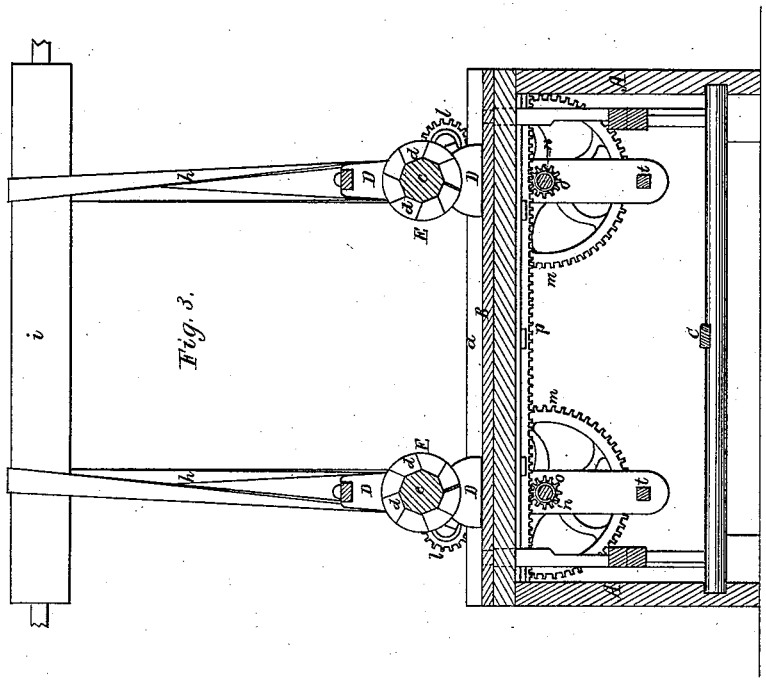
Witnesses.
S. N. Piper
L. W. Miller
William Panton.
by his attorney.
R. H. Eddy

UNITED STATES PATENT OFFICE.

WILLIAM PANTON, OF QUINCY, MASSACHUSETTS.

IMPROVEMENT IN MACHINERY FOR SCOURING AND DRESSING LEATHER.

Specification forming part of Letters Patent No. 193,615, dated July 31, 1877; application filed May 28, 1877.

*To all whom it may concern:*

Be it known that I, WILLIAM PANTON, of Quincy, of the county of Norfolk and State of Massachusetts, have invented a new and useful Improvement in Machinery for Stretching and Scouring Skins or Leather; and do hereby declare the same to be fully described in the following specification, and represented in the accompanying drawings, of which—

Figure 1:
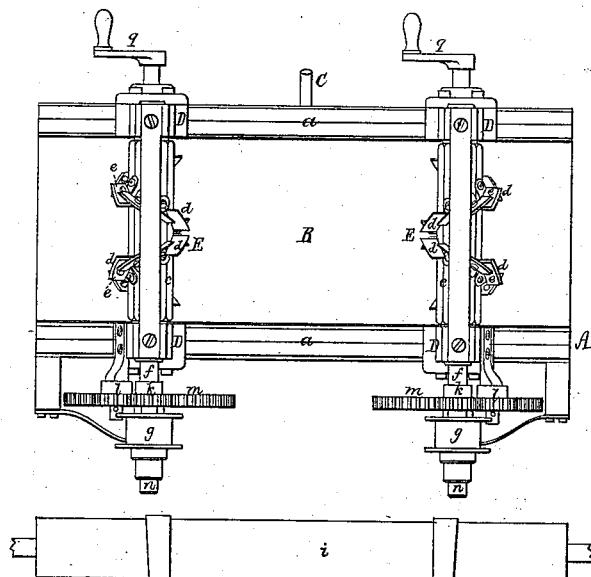
Figure 2:
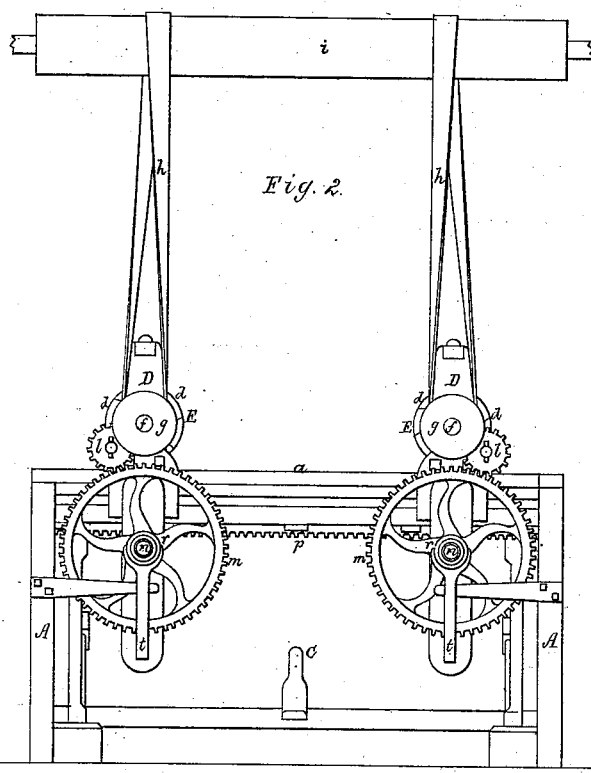

Figure 1 is a top view, Fig. 2 a rear elevation, Fig. 3 a longitudinal section, and Fig. 4 a transverse and vertical section, of a machine embodying my invention.

In such drawings, A denotes the frame for supporting the main operative parts, there being within such frame, and between two parallel ways or rails, a a, arranged thereon, as shown, a platform or bed, B, so applied to the frame as to be movable vertically therein, and by means of a pedal, C, suitably applied to both frame and platform. On the said ways are two scourer-carriers or carriages, D D, so applied thereto and to the frame as to be capable of being moved rectilinearly toward or away from each other. Within each of such carriers there is arranged a rotary scourer, E, composed of a prism, c, and sets of scouring-blades, d, and their supporters e, each of such sets being arranged in a helix about the prism, and extended from its middle to or near to its end, all as shown. Each blade-supporter e, formed in manner as represented, is secured to the prism by a clamp-screw, whereby such blade or scraper is rendered adjustable obliquely with reference to the axis of the prism. The shaft f of each prism, supported in suitable bearings in the carrier, has a pulley, g, fixed on it, an endless band, h, going around such pulley, and a long driving-drum, i, arranged as represented. Furthermore, there is upon each shaft f a spur-gear, k, which engages with an intermediate gear, l, which, in turn, engages with a larger gear, m, placed on and concentric with a shaft, n, arranged as represented. Each shaft n, duly supported in one of the scourer-carriers D D, is furnished with two pinions, o o, to engage with toothed racks p p, applied to the frame A. Such shaft n also has fixed to it a crank, q, by which it may be revolved by an attendant. By turning such crank the carrier may be caused to move rectilinearly, either forward or backward, over the platform. Each gear m revolves freely on its shaft, but they are provided with a clutch and its actuating slide, to effect the clutching of the gear to, or the unclutching of it from, the shaft. The said clutch is shown at r s, and the slide at t. When the gear m is clutched to its shaft, such shaft will be revolved by the gears k l m, whereby the carrier which supports the shaft will be moved along and on its ways.

In operating on a hide or skin by this machine, such hide or skin, in a wet state, is to be laid on the platform, which should be forced upward, so as to bring the hide or skin into contact with the scourers in revolution. Such scourers, while revolving, should be moved lengthwise over the hide or skin. They will not only stretch it lengthwise, but widthwise, and scour it in the meantime.

I do not claim a movable platform and one or more rotary rubbers arranged over it, for pebbling, graining, softening, or polishing leather, all being as shown in the United States Patents Nos. 9,292 and 159,092, as my machine is for a different purpose, viz., for stretching and scouring skins, and operates differently.

I claim—

In combination with the platform B, (provided with the pedal C, or suitable mechanism for moving it vertically, as described,) the two rotary scourers E, arranged in separate carriers D D, movable toward or away from each other and over the said platform, and having mechanism for so moving them and revolving the scourers, as explained, consisting of the drum i, belts h h, pulleys g, shafts f n, gears k l m o, rack p, cranks q, clutch r s, and slide t, all arranged and applied as set forth.

WM. PANTON.

Witnesses:
R. H. EDDY,
JOHN R. SNOW.